(12) United States Patent
Choudha et al.

(10) Patent No.: US 10,475,405 B2
(45) Date of Patent: Nov. 12, 2019

(54) DYNAMIC CONTROL OF DISPLAY REFRESH RATE BASED ON USER INTERFACE ACTIVITY

(71) Applicant: QUALCOMM Incorporated, San Diego, CA (US)

(72) Inventors: Ankita Anil Kumar Choudha, Hyderabad (IN); Soman Nikhara, Hyderabad (IN); Vishnuvardhan Prodduturi, Hyderabad (IN); Prashant Nukala, Hyderabad (IN); Jayant Shekhar, Hyderabad (IN); Raviteja Tamatam, Hyderabad (IN); Kalyan Thota, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 15/834,915

(22) Filed: Dec. 7, 2017

(65) Prior Publication Data

US 2019/0180705 A1 Jun. 13, 2019

(51) Int. Cl.
| G09G 3/36 | (2006.01) |
| G09G 5/34 | (2006.01) |
| G06F 3/041 | (2006.01) |
| G09G 3/34 | (2006.01) |
| G06F 3/0485 | (2013.01) |

(52) U.S. Cl.
CPC ......... *G09G 3/3618* (2013.01); *G06F 3/0414* (2013.01); *G06F 3/0485* (2013.01); *G09G 3/3413* (2013.01); *G09G 5/34* (2013.01); *G09G 2320/103* (2013.01); *G09G 2340/0435* (2013.01); *G09G 2354/00* (2013.01); *G09G 2360/08* (2013.01); *G09G 2360/18* (2013.01)

(58) Field of Classification Search
CPC ....... G06F 3/016; G06F 3/0482; G06F 3/0488
See application file for complete search history.

(56) References Cited

U.S. PATENT DOCUMENTS

| 6,339,417 | B1 | 1/2002 | Quanrud |
| 8,842,111 | B2 | 9/2014 | Kambhatla et al. |
| 9,652,816 | B1 | 5/2017 | Holland et al. |
| 9,785,332 | B1 | 10/2017 | Karppanen et al. |
| 2004/0268072 | A1 | 12/2004 | Torii et al. |
| 2011/0080419 | A1 | 4/2011 | Croxford et al. |
| 2012/0218191 | A1 | 8/2012 | Huang et al. |
| 2014/0118224 | A1 | 5/2014 | Teng et al. |
| 2015/0177932 | A1* | 6/2015 | Yoo .................. G06F 3/0482 715/702 |
| 2015/0228248 | A1 | 8/2015 | Croxford et al. |

(Continued)

OTHER PUBLICATIONS

Non-Final Office Action from U.S. Appl. No. 15/834,847 dated Nov. 9, 2018 (15 pp).

(Continued)

*Primary Examiner* — Kevin M Nguyen
(74) *Attorney, Agent, or Firm* — Shumaker & Sieffert, P.A.

(57) ABSTRACT

Techniques are described for controlling the display refresh rate of a display panel. A display driver may determine a display refresh rate based on user activity. One example of user activity is a rate at which a user is scrolling image content being displayed on the display panel. One example of user activity is a duration or pressure of a user interaction with a display panel or a pressure sensor.

21 Claims, 6 Drawing Sheets

(56) References Cited

U.S. PATENT DOCUMENTS

| | | |
|---|---|---|
| 2016/0078838 A1 | 3/2016 | Huang et al. |
| 2016/0125785 A1 | 5/2016 | Wang et al. |
| 2016/0092010 A1 | 9/2016 | Tripathi et al. |
| 2016/0274690 A1 | 9/2016 | Tripathi et al. |
| 2016/0357391 A1* | 12/2016 | Nilo .................... G06F 3/0416 |

OTHER PUBLICATIONS

"HTC U11," HTC accessed on Sep. 28, 2017 from http://www.htc.com/in/smartphones/htc-u11/, 4 pp.

Maity, "What is HTC Edge Sense?—Know About the Signature Feature of U11," May 17, 2017 accessed from htttps://gadgetstouse.com/featured/htc-edge-sense-features/57835, 3 pp.

U.S. Appl. No. 15/834,847, filed by Ankita Anil Kumar Choudha et al., filed Dec. 7, 2017.

Response to Office Action dated Nov. 9, 2018, for U.S. Appl. No. 15/834,847, filed Feb. 8, 2019, 14 pp.

Office Action from U.S. Appl. No. 15/834,847 dated May 23, 2019 (17 pp).

* cited by examiner

US 10,475,405 B2

DYNAMIC CONTROL OF DISPLAY REFRESH RATE BASED ON USER INTERFACE ACTIVITY

TECHNICAL FIELD

The disclosure relates to display refresh rate.

BACKGROUND

Display refresh rate refers to the rate at which a display processor replaces the image frame currently being displayed with a new image frame. In a video mode panel, the display panel does not include its own memory and therefore the entire current frame is replaced by a new frame, regardless of whether image content changed from one frame to another.

SUMMARY

In general, this disclosure describes techniques for controlling a display refresh rate for a display processor. In examples described in this disclosure, a touch controller may output information of a user interaction. One example of the information of the user interaction is a rate at which a user is changing image content on a display. Another example of the information of user interaction is information of a duration or pressure of the user's interaction. Processing circuitry may utilize the information indicating the rate and/or the duration and pressure to adjust the display refresh rate. For instance, if the user is interacting to change image content relatively quickly, the processing circuitry may determine a scaling factor that adjusts the display refresh rate at a relatively high rate. If the user is interacting to change image content relatively slowly, the processing circuitry may determine a scaling factor that adjusts the display refresh rate at a relatively low rate. As another example, the processing circuitry may determine a relatively high display refresh rate if the user presses on a pressure sensor for an extended period of time.

In one example, the disclosure describes a method for display refresh rate adjustment, the method comprising determining a rate at which a user is scrolling image content being displayed on a display panel, determining a display refresh rate of the display panel based at least in part on the rate at which the user is scrolling image content, the display refresh rate indicating how often image content from a system memory is retrieved and displayed on the display panel, and causing the display panel to display image content at the determined display refresh rate.

In one example, the disclosure describes a device for display refresh rate adjustment, the device comprising a system memory, a display panel, and processing circuitry. The processing circuitry is configured to determine a rate at which a user is scrolling image content being displayed on the display panel, determine a display refresh rate of the display panel based at least in part on the rate at which the user is scrolling image content, the display refresh rate indicating how often image content from the system memory is retrieved and displayed on the display panel, and cause the display panel to display image content at the determined display refresh rate.

In one example, the disclosure describes a device for display refresh rate adjustment, the device comprising a system memory, a display panel, means for determining a rate at which a user is scrolling image content being displayed on the display panel, means for determining a display refresh rate of the display panel based at least in part on the rate at which the user is scrolling image content, the display refresh rate indicating how often image content from the system memory is retrieved and displayed on the display panel, and means for causing the display panel to display image content at the determined display refresh rate.

In one example, the disclosure describes a computer-readable storage medium storing instructions that when executed cause one or more processors of a device for display refresh rate adjustment to determine a rate at which a user is scrolling image content being displayed on a display panel, determine a display refresh rate of the display panel based at least in part on the rate at which the user is scrolling image content, the display refresh rate indicating how often image content from a system memory is retrieved and displayed on the display panel, and cause the display panel to display image content at the determined display refresh rate.

In one example, the disclosure describes a method for display refresh rate adjustment, the method comprising receiving information indicative of a duration or pressure of a user interaction with a display panel or a pressure sensor, generating, with an application, image content for display on the display panel based on the user interaction, determining a display refresh rate of the display panel based at least in part on the received information indicative of the duration or pressure of the user interaction, the display refresh rate indicating how often image content from a system memory is retrieved and displayed on the display panel, and causing the display panel to display image content based at least in part on the determined display refresh rate.

In one example, the disclosure describes a device for display refresh rate adjustment, the device comprising a system memory, a display panel, a pressure sensor, and processing circuitry. The processing circuitry is configured to receive information indicative of a duration or pressure of a user interaction with the display panel or the pressure sensor, generate, with an application, image content for display on the display panel based on the user interaction, determine a display refresh rate of the display panel based at least in part on the received information indicative of the duration or pressure of the user interaction, the display refresh rate indicating how often image content from the system memory is retrieved and displayed on the display panel, and cause the display panel to display image content based at least in part on the determined display refresh rate.

In one example, the disclosure describes a device for display refresh rate adjustment, the device comprising a system memory, a display panel, a pressure sensor, means for receiving information indicative of a duration or pressure of a user interaction with the display panel or the pressure sensor, means for generating, with an application, image content for display on the display panel based on the user interaction, means for determining a display refresh rate of the display panel based at least in part on the received information indicative of the duration or pressure of the user interaction, the display refresh rate indicating how often image content from the system memory is retrieved and displayed on the display panel, and means for causing the display panel to display image content based at least in part on the determined display refresh rate.

In one example, the disclosure describes a computer-readable storage medium storing instructions that when executed cause one or more processors of a device for display refresh rate adjustment to receive information indicative of a duration or pressure of a user interaction with a display panel or a pressure sensor, generate, with an application, image content for display on the display panel based on the user interaction, determine a display refresh rate of the display panel based at least in part on the received information indicative of the duration or pressure of the user interaction, the display refresh rate indicating how often image content from a system memory is retrieved and displayed on the display panel, and cause the display panel to display image content based at least in part on the determined display refresh rate.

The details of one or more examples are set forth in the accompanying drawings and the description below. Other features, objects, and advantages will be apparent from the description, drawings, and claims.

DETAILED DESCRIPTION

Figure 1:
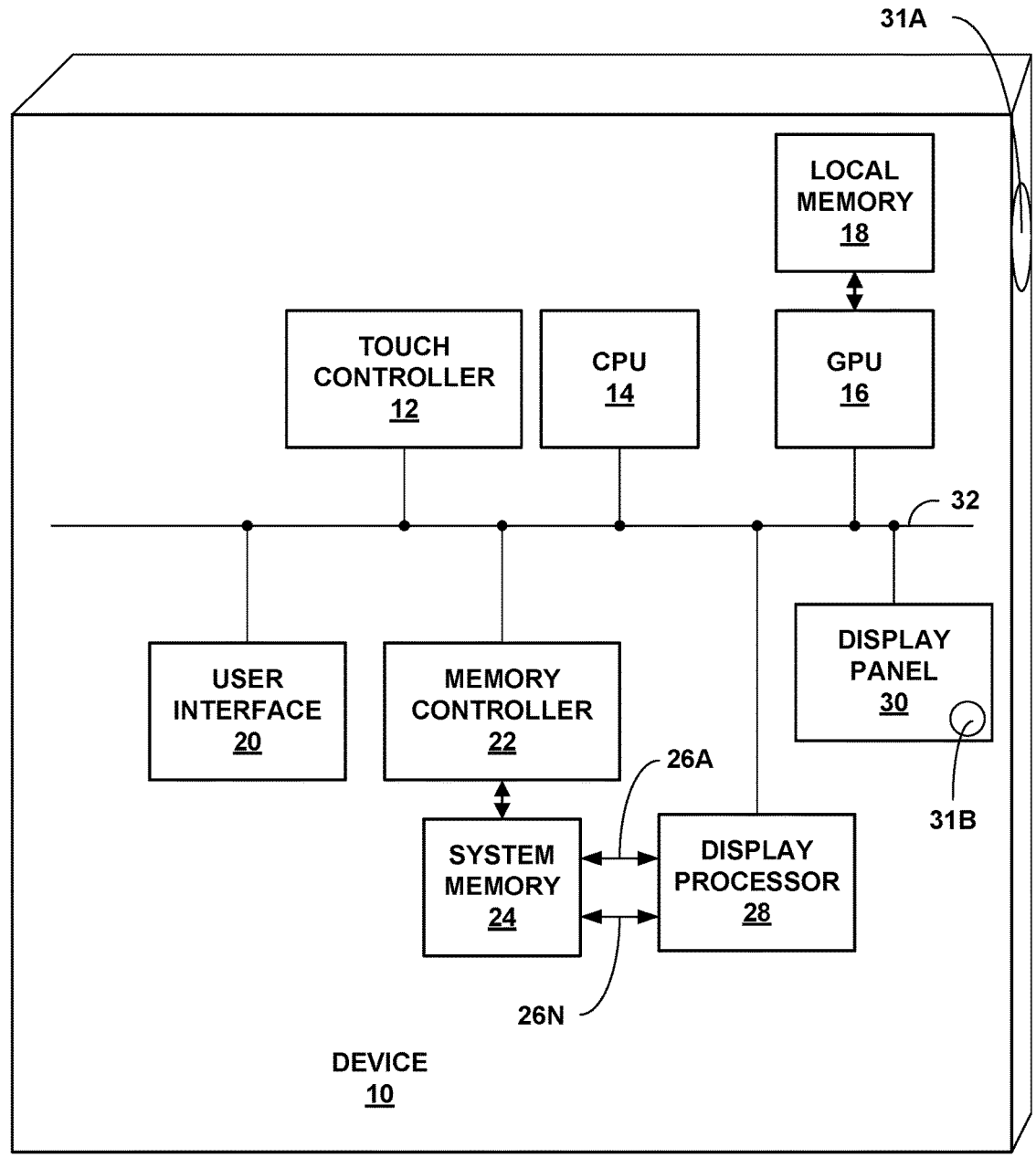
FIG. 1 is a block diagram of a computing device configured to perform one or more of the example techniques described in this disclosure.

This disclosure describes example ways to dynamically control the display refresh rate of a display panel based on user interface activity. User interface activity, in one example, refers to the rate at which image content is changing on the user interface due to user interaction. For example, as the user is scrolling through a text application and reading, the user interacts with the user interface to scroll up and down on the image content. The user interface may be the display panel itself, but not necessarily so in all cases. Another example of user interface activity is the user pressing down on a pressure sensor to change the rate at which image content is changing. The pressure sensor may be part of the display panel or its own separate sensor. In some examples, the pressure that the user applies to the pressure sensor may be one example way in which the user scrolls up or down the image content. In some examples, the swiping motion may be the way in which the user scrolls up or down the image content. Other examples of the swiping motion include scrolling side to side or pinch/zoom to modify the image content being displayed. In this disclosure, scrolling is used to indicate the various ways in which the user may modify the image content such as by swiping or zooming.

How fast the display needs to be refreshed (e.g., display refresh rate) is based on how fast the user is scrolling. For example, for fast scrolling, the display refresh rate needs to be faster because image content is changing more quickly than the display refresh rate needed for slower scrolling.

A touch controller determines the rate at which the user is scrolling the image content. A UI activity rate change (UARC) hardware or software determines by how much to adjust the display refresh rate based on the scrolling rate. A display driver instructs the display processor to adjust the display panel refresh rate based on the determination by the UARC.

As noted above, user interface activity, as another example, refers to duration or pressure of a user interaction with the display panel or pressure sensors of the device. The pressure sensors may be part of the display panel in some examples. A duration or pressure of a user interaction refers to just a duration, just a pressure, or both duration and pressure of the user interaction. The user may apply pressure to one or more sensors on the display panel or on pressure sensors along one or more edges of the device. An application may generate image content for display based on the user interaction (e.g., the pressure or duration of the user interaction with the display panel or pressure sensors may cause the application to perform different operations).

The duration or pressure of the user interaction with the display panel or pressure sensors may determine a display refresh rate. For instance, a soft touch (e.g., with low pressure) may be indicative of pausing video content being displayed, meaning that the display panel does not need to be refreshed as often. A hard touch (e.g., with high pressure) may be indicative of fast-forwarding video content being displayed, meaning that the display panel needs to be refreshed more often. In some examples, the display driver may receive information indicative of the duration or pressure of the user interaction, and may determine the display refresh rate based on, at least in part, the duration or pressure. The display driver may determine the display refresh rate without receiving information from the application or a hardware abstraction layer (HAL) of the display refresh rate. In this way, the display driver may be able to more quickly determine a display refresh rate, rather than waiting on information from the application or HAL of the display refresh rate.

Accordingly, this disclosure describes examples of determining the display refresh rate based on user activity such as duration and pressure of user interaction and/or rate at which user is scrolling image content. In some examples, the duration and pressure of user interaction may be one way in which the user sets the rate at which to scroll the image content. The display driver may receive information of the user activity (e.g., scrolling rate and/or duration or pressure of user interaction). By directly receiving the user activity information and determining the display refresh rate, the display driver may more quickly determine the display refresh rate as compared to relying on the application or HAL to determine the display refresh rate.

In this disclosure, the display panel may operate in video mode. In the video mode, the display processor needs to refresh the entire display panel periodically, not just a subset of the image content displayed on the display panel. The display panel does not include a frame buffer. Accordingly, in video mode, the image content is retrieved from system memory at the display refresh rate (e.g., 10 fps) and the entire image content on the display panel is replaced with the retrieved image content.

FIG. 1 is a block diagram illustrating an example device for display refresh rate adjustment in accordance with one or more example techniques described in this disclosure. FIG. 1 illustrates device 10, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

In the example of FIG. 1, device 10 includes touch controller 12, central processing unit (CPU) 14, graphics processing unit (GPU) 14, local memory 18, user interface 20, memory controller 22, system memory 24, one or more pipes 26A-26N (collectively pipes 26), display panel 30, pressure sensor 31A, and bus 32. Although one pressure sensor 31A is illustrated on the side of device 10, in some examples, there may be a plurality of pressure sensors located on device 10, such as on the side or flush with device 10.

Display panel 30 may also include pressure sensor 31B. Pressure sensor 31B is shown to assist with understanding that display panel 30 may generate output signals indicative of duration and pressure of user interaction with display panel 30. Pressure sensor 31B need not be located at the illustrated location in display panel 30. Display panel 30 may include a plurality of pressure sensors arranged on display panel 30.

In examples where device 10 is a mobile device, display processor 28 is a mobile display processor (MDP). In some examples, such as examples where device 10 is a mobile device, touch controller 12, CPU 14, GPU 16, and display processor 28 may be formed as an integrated circuit (IC). For example, the IC may be considered as a processing circuit within a chip package, and may be a system-on-chip (SoC). In some examples, touch controller 12 may be in one housing, and CPU 14, GPU 16, and display processor 28 may be housed together in another IC. It may be possible that touch controller 12, CPU 14, GPU 16, and display processor 28 are all housed in different integrated circuits in examples where device 10 is a mobile device. Other permutations and combinations of the housing of touch controller 12, CPU 14, GPU 16, and display processor 28 is possible.

Examples of touch controller 12, CPU 14, GPU 16, and display processor 28 include, but are not limited to, one or more digital signal processors (DSPs), general purpose microprocessors, application specific integrated circuits (ASICs), field programmable logic arrays (FPGAs), or other equivalent integrated or discrete logic circuitry. In some examples, GPU 16 and display processor 28 may be specialized hardware that includes integrated and/or discrete logic circuitry that provides GPU 16 and display processor 28 their processing capabilities. For instance, display processor 28 may be specialized integrated circuit hardware that is designed to retrieve image content from system memory 24, compose the image content into an image frame, and output the image frame to display panel 30.

In general, CPU 14, GPU 16, and display processor 28 are examples of processing circuitry configured to perform the example techniques described in this disclosure. Processing circuitry as used in this disclosure may include CPU 14, GPU 16, display processor 28, or any combination thereof, and generally refers to circuitry configured to perform the example techniques described in this disclosure. The processing circuitry includes fixed-function circuitry and/or programmable circuitry. Accordingly, the example techniques may be performed with fixed-function circuitry, programmable circuitry, or a combination of fixed-function and programmable circuitry.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Device 10 may also include display panel 30 and user interface 20. Although not illustrated, device 10 may include a transceiver module. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display panel 30 may be external to device 10 in examples where device 10 is a desktop computer. As another example, user interface 20 may be part of display panel 30 in examples where display panel 30 is a touch-sensitive or presence-sensitive display of a mobile device.

Display panel 30 may comprise a liquid crystal display (LCD), a cathode ray tube (CRT) display, a plasma display, a touch-sensitive display, a presence-sensitive display, or another type of display device. User interface 20 is used in this disclosure to generically refer to ways in which a user may interface with device 10. Examples of user interface 20 include, but are not limited to, a trackball, a mouse, a keyboard, and other types of input devices. User interface 20 may also be a touch screen and may be incorporated as a part of display panel 30. Although shown separately, pressure sensors 31A, 31B may be considered as examples of user interface 20. The transceiver module (not shown) of device 10 may include circuitry to allow wireless or wired communication between device 10 and another device or a network. The transceiver module may include modulators, demodulators, amplifiers and other such circuitry for wired or wireless communication.

Memory controller 22 facilitates the transfer of data going into and out of system memory 24. For example, memory controller 22 may receive memory read and write commands, and service such commands with respect to memory 24 in order to provide memory services for the components in computing device 10. Memory controller 22 is communicatively coupled to system memory 24. Although memory controller 22 is illustrated in the example of device 10 of FIG. 1 as being a processing circuit that is separate from both CPU 14 and system memory 24, in other examples, some or all of the functionality of memory controller 22 may be implemented on one or both of CPU 14 and system memory 24.

System memory 24 may store program modules and/or instructions and/or data that are accessible by CPU 14 and GPU 16. For example, system memory 24 may store user applications (e.g., instructions for the camera application), resulting images from GPU 16, etc. System memory 24 may additionally store information for use by and/or generated by other components of device 10. System memory 24 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 24 may include instructions that cause CPU 14, GPU 16, and display processor 28 to perform the functions ascribed to these components in this disclosure. Accordingly, system memory 24 may be a computer-readable storage medium having instructions stored thereon that, when executed, cause one or more processors (e.g., CPU 14, GPU 16, and display processor 28) to perform various functions.

In some examples, system memory 24 is a non-transitory storage medium. The term "non-transitory" indicates that the storage medium is not embodied in a carrier wave or a propagated signal. However, the term "non-transitory" should not be interpreted to mean that system memory 24 is non-movable or that its contents are static. As one example, system memory 24 may be removed from computing device 10, and moved to another device. As another example, memory, substantially similar to system memory 24, may be inserted into computing device 10. In certain examples, a non-transitory storage medium may store data that can, over time, change (e.g., in RAM).

CPU 14 may execute various types of applications. Examples of the applications include web browsers, e-mail applications, spreadsheets, video games, or other applications that generate viewable objects for display. System memory 24 may store instructions for execution of the one or more applications. The execution of an application on CPU 14 causes CPU 14 to produce graphics data for image content that is to be displayed. CPU 14 may transmit graphics data of the image content to GPU 16 for further processing based on and instructions or commands that CPU 14 transmits to GPU 16.

CPU 14 may communicate with GPU 16 in accordance with a particular application processing interface (API). Examples of such APIs include the DirectX® API by Microsoft®, the OpenGL® API or OpenGL ES® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and CPU 14 and GPU 16 may utilize any technique for communication.

In accordance with the example techniques described in this disclosure, display processor 28 may be configured to composite the various image content stored in system memory 24 for display on display panel 30. For instance, in addition to communication via bus 32, display processor 28 may be coupled to system memory 24 via a plurality of pipes 26. Display processor 28 may be configured to retrieve the image content from different applications executing on CPU 14 or image content generated from GPU 16, stored in system memory 24, via pipes 26.

As an example, CPU 14 may execute a plurality of applications that each generate image content. For instance, CPU 14 may execute a video player application that uses a hardware or software video decoder (not shown) to generate video content that is stored in system memory 24. As another example, CPU 14 may execute a web browser that produces text content that is stored in system memory 24.

Display processor 28 retrieves the image content, via pipes 26, and composites one single frame for display. For example, image content from one application may occlude image content from another application, and display processor 28 may ensure that the image content that is occluded does not interfere with the image content that is occluding. In general, compositing means that display processor 28 stitches image content from different applications into a single frame. Display processor 28 may perform additional functions such as filtering as well.

Display processor 28 generates image signals that display processor 28 outputs to display panel 30 that cause display panel 30 to display the image content. In this way, display panel 30 may be configured to display the image content generated by the various applications to a user.

In many cases, the image content from the applications is not static and is changing. Accordingly, display processor 28 periodically refreshes the image content displayed on display panel 30. For example, display processor 28 periodically retrieves image content from system memory 24, where the image content may have been updated by the execution of the applications, and outputs image signals to display panel 30 to display the updated image content.

Display panel 30 may be configured in accordance with the MIPI DSI (Mobile Industry Processor Interface, Display Serial Interface) standard. The MIPI DSI standard supports a video mode and command mode. In examples where display panel 30 is a video mode panel, display processor 28 may need to continuously refresh display panel 30 and display panel 30 does not need or include a frame buffer. In examples where display panel 30 is a video mode panel, the entire image content is refreshed per refresh cycle (e.g., line-by-line). In examples where display panel 30 is a command mode panel, display panel 30 includes a frame buffer to which display processor 28 writes the image content of the frame. Display processor 28 then writes from the frame buffer to display panel 30. In such examples where display panel 30 is a command mode panel, display processor 28 may not need to refresh display panel 30 continuously. In some examples, display panel 30 may be fixed in the video mode panel and does not switch to operate in different modes.

The rate at which display processor 28 refreshes the image content displayed on display panel 30 is referred to as the display refresh rate. Examples of the display refresh rate include 30 frames per second (fps), 60 fps, 120 fps, or potentially any number of frames per second. For examples where display panel 30 is a video mode panel, having an N fps means that display processor 28 is continuously updating display panel 30 such that after every 1/N seconds, display panel 30 is refreshed with one entire frame. As an example, if there are 100 lines on display panel 30, then display processor 28 continuously updates display panel 30 line-by-line, and after 1/N seconds, all 100 lines would have been refreshed by display processor 28, and display processor 28 begins to refresh line 1 of the 100 lines of display panel 30. For examples where display panel 30 is a command mode panel, having an N fps means that the frame buffer outputs pixel values to display panel 30 such that display panel 30 is refreshed with a frame every 1/N seconds. For purposes of illustration, the example techniques are described herein with respect to display panel 30 being a video mode panel, but the techniques are applicable to other example configurations of display panel 30 including examples where display panel 30 is configured in accordance with the command mode panel.

In general, video mode refers to transactions taking the form of a real-time pixel stream where display panel 30 does not include an external RAM. Display processor 28 refreshes the image data continuously. Command mode refers to transactions taking the form of sending commands and data to a peripheral display panel 30. This mode is typically used for a panel with external RAM that can self-refresh in the case of a static image update.

There may be various factors that affect the display refresh rate. As one example, if CPU 14 is executing a video player application, then CPU 14 and/or GPU 16 may generate image content at a relatively high rate (e.g., dynamic image content). For smooth playback of the image content, display processor 28 may need to refresh the image content on display panel 30 at a relatively high display refresh rate. As another example, if CPU 14 is executing a web browser, CPU 14 and/or GPU 16 may generate image content at a relatively low rate because the image content may not change often (e.g., static image content). In such examples, display processor 28 may refresh the image content on display panel 30 at a relatively low display refresh rate.

In some examples, CPU 14 may be configured to set the display refresh rate of display processor 28, but it may be possible for display processor 28 to directly set its own display refresh rate or for some other circuit to set the display refresh rate. For purposes of example, CPU 14 is described as setting the display refresh rate of display processor 28. For instance, CPU 14 executes a display driver, and the display driver, receives as input, information indicating a rate at which the various applications (e.g., video player, web browser, etc.) are changing the image content. Based on the information, the display driver may determine the display refresh rate, and output information used by display processor 28 to set the display refresh rate.

In accordance with the techniques described in this disclosure, factors that may affect the display refresh rate include a rate at which the user is scrolling image content on display panel 30, and or a duration or pressure of the user interaction with pressure sensor 31A and/or 31B. The user may interact with user interface 20 to scroll the image content currently shown on display panel 30 up, down, left, right, or diagonally, or cause a change in the image content being shown on display panel 30 by pressing down on pressure sensor 31A or 31B In the techniques described in this disclosure, the user activity affects the display refresh rate. As described above, the examples of user activity include the rate at which the user is scrolling the image content and the duration or pressure of the user interaction.

As also described above, in some examples, display panel 30 and pressure sensor 31A may be part of user interface 20, and therefore, the user may scroll the image content by swiping vertically, horizontally, or diagonally the image content displayed on display panel 30 to scroll the image content vertically, horizontally, or diagonally. Similarly, the user may apply pressure by pressing down on pressure sensors 31A or 31B to change the image content being displayed on display panel 30. In some examples, the user may scroll image content by pressing down on pressure sensors 31A or 31B. In other words, the pressure and duration of the user interaction with display panel 30 or pressure sensor 31A may be another way in which the user may scroll the image content on display panel 30.

In examples where display panel 30 is a video mode panel, every time the user scrolls image content, all of the image content needs to be refreshed. Therefore, some conventional techniques increase the display refresh rate to a relatively high rate in response to a user interacting with user interface 20. For instance, in these conventional techniques, as soon as a user swipes display panel 30, or otherwise interacts with user interface 20 (e.g., based on pressing on pressure sensor 31A or 31B), to indicate scrolling of image content, the display driver, executing on CPU 14, instructs display processor 28 to immediately increase the display refresh rate to a high display refresh rate to accommodate the scrolling so as to provide smooth image content when scrolling. If the display refresh rate were too slow, then the image content would appear laggy or jumpy as the user scrolled the image content.

As an example, for a static scene, CPU 14 may reduce the display refresh rate to optimize power consumption. For video model panel, for a static scene, CPU 14 may reduce the display refresh rate to 48 Hz (e.g., 48 fps) from 60 Hz (e.g., 60 fps). The minimum display refresh rate depends on the characteristics of display panel 30 and is typically 48 Hz for LCD panels.

As described above, in some conventional techniques, as soon as the user interacts to scroll, CPU 14 may increase the display refresh rate to a high rate. For instance, the display refresh rate may be 48 Hz, and CPU 14 may increase the display refresh rate to the maximum display refresh rate of 60 Hz in response to an indication that the user is scrolling image content regardless of how slow or fast the user is scrolling the image content.

However, there may be instances where increasing the display refresh rate to a high display refresh rate, while ensuring that the image content is displayed smoothly during scrolling, is not needed. Unnecessarily increasing the display refresh rate causes display processor 28 to consume more power and causes more bandwidth usage of bus 32 and/or pipes 26 than necessary.

In accordance with the techniques described in this disclosure, the display driver, executing on CPU 14, may receive information indicating the rate at which the user is scrolling the image content, and not just information that the user is scrolling the image content to determine the display refresh rate. For example, if the user is scrolling the image content slowly such as for reading a text file, reading messages from a messaging application, or reading content from a web browser application, CPU 14 may determine a lower display refresh rate rather than the maximum display refresh rate to improve power and bandwidth utilization without impacting smooth image content display during scrolling.

The rate at which the user is scrolling the image content and mere interaction with user interface 20 to scroll image content should not be confused. The rate at which the user is scrolling the image content is a measure of how fast the user is indicating image content on display panel 30 should change. Mere interaction with user interface 20 to scroll is an indication that image content is to be scrolled with no information about how fast the user is indicating image content on display panel 30 should change.

For instance, in examples where display panel 30 is part of user interface 20, the rate at which the user is scrolling the image content is a measure of distance traveled along display panel 30 by a digit of the user or a stylus pen used by the user per unit of time. Touch controller 12 may be configured to determine the rate at which the user is scrolling the image content. For example, touch controller 12 includes circuitry that senses interactions between the user and user interface 20 including examples where display panel 30 is part of user interface 20. As the user interacts with display panel 30, sensors in display panel 30 output signals to touch controller 12 that indicate which sensors were activated. Touch controller 12 utilizes the sensor output signals to determine that the user interacted with display panel 30, a vector indicating the direction in which the user scrolled image content (e.g., vertically, horizontally, or diagonally), and a rate at which the user is scrolling the image content. For example, the number of sensors of display panel 30 that are activated per unit of time indicates the rate at which the user is scrolling the image content.

User interface 20 (e.g., part of display panel 30 or otherwise) is one example of a user interface, and device 10 may include additional user interfaces. Additional examples of a user interface are pressure sensors 31A and 31B. Although one pressure sensor 31A is illustrated, there may be a plurality of sensors like pressure sensor 31A arranged along edges of device 10, including top, bottom, and side edges. Furthermore, although the example is described with respect to pressure sensors 31A and 31B, the techniques are not so limited, and may be applicable to sensors located elsewhere on device 10 including on the back or the front of device 10, or flush with the housing of device 10.

In some examples, pressure sensor 31A may be a hardware sensor such as a button or some other physical button rather than part of the housing of device 10 or part of display panel 30. For example, pressure sensor 31A may protrude out of the side of device 10, and the user may feel the protrusion when placing his/her finger over pressure sensor 31A. The user may then push down on pressure sensor 31A. As another example, pressure sensor 31A may be a capacitive sensor that is flush with the housing of device 10. In this example, the user placing his or her finger on pressure sensor 31A, without necessarily pressing down, causes a change in the capacitance, which in turn indicates user interaction with pressure sensor 31A.

Touch controller 12 may receive signals from pressure sensors 31A or 31B in response to a user interaction with pressure sensors 31A or 31B. For example, in response to a user pressing down on pressure sensors 31A or 31B, pressure sensors 31A or 31B may output an electrical signal that touch controller 12 receives. Touch controller 12 may determine a duration or amount of pressure that the user applied on pressure sensors 31A or 31B based on the received electrical signal (e.g., based on the amplitude of the electrical signal and duration that the electrical signal was received with an amplitude over a certain threshold). The duration or amount of pressure may correlate to a rate at which the user wants to scroll the image content, or may correlate to a display refresh rate. As described in more detail, the duration or amount of pressure applied to pressure sensors 31A or 31B may also set the display refresh rate.

CPU 14 may determine a rate at which a user is scrolling the image content being displayed on display panel 30. For instance, CPU 14 may receive information from touch controller 12 indicating the rate at which the user is scrolling the image content. CPU 14 (e.g., based on the execution of the display driver) may determine a display refresh rate of display panel 30 based at least in part on the rate at which the user is scrolling the image content. As described above, the display refresh rate is indicative of how often image content from system memory 24 is retrieved and displayed on display panel 30. CPU 14 (e.g., based on the execution of the display driver) and instructions to display processor 28 may cause display panel 30 to display image content at the determined display refresh rate.

In some examples, an application that generated the image content that the user is scrolling may be configured to determine a display refresh rate based on the rate at which the user is scrolling the image content. In one or more examples, the display driver may determine the display refresh rate without input from the application generating the image content or input from a display hardware abstraction layer (HAL) application that indicates the display refresh rate. The display HAL application is an application that allows applications that generate image content to communicate with the display driver, and vice-versa. In some examples, the display driver may determine the display refresh rate before the application or the display HAL application determines the display refresh rate. For instance, the display driver may directly receive information (e.g., via touch controller 12) indicative of the rate at which the user is scrolling image content, and determine the display refresh rate based on the directly received information without passing through the display HAL application or the application that generated the image content.

The above techniques describe scrolling as one example user activity used to determine the display refresh rate. However, the example techniques are not so limited. As another example, CPU 14 may determine the display refresh rate based on a duration and pressure of a user interaction with display panel 30 (e.g., via pressure sensor 31B) or pressure sensor 31A.

The pressure sensors 31A and 31B may be configured to output signals indicative of the amount of pressure that the user applied and/or the duration of user contact. Touch controller 12 may then output information indicative of the amount of pressure or duration to the display driver.

The display driver may determine the display refresh rate based on the amount of duration or pressure. As described above, some conventional techniques increased the display refresh rate simply in response to a touch from the user. Such conventional techniques failed to account for the duration or pressure of the user interaction, and further failed to account for operations that would occur in response to the user interaction.

As an example, the amount of pressure or duration of contact that a user applies to a messaging application may cause the messaging application to display a video on display panel 30. As another example, the amount of pressure or duration of contact that a user applies to a video player application may cause the video player application to pause the display of video. Other examples of changing operations performed by an application (e.g., messaging application or video player application) based on pressure and duration of user interaction with display panel 30 (e.g., via pressure sensor 31B) or pressure sensor 31A are possible. Again, although the techniques are described with respect to one pressure sensor 31A and one pressure sensor 31B, the techniques are applicable to examples where device 10 includes a plurality of pressure sensors like pressure sensor 31A, and display panel 30 may include a plurality of pressure sensors like pressure sensor 31B.

Accordingly, simply increasing the display refresh rate in response to receiving a user interaction may be improper resulting in an unnecessarily high display refresh rate, when such a rate is not needed. Furthermore, different amounts of pressure and duration of the user interaction result in different operations that need to be performed. Hence, relying simply on user interaction to increase display refresh rate, without accounting for pressure or duration, may result in less optimal operation.

Similar to the above with respect to the scrolling image content, some conventional techniques determined the display refresh rate based on information only from the display HAL or the application that generated the image content. For example, the video player application or display HAL may indicate that the display refresh rate should be decreased in response to receiving the user interaction to pause the video content. However, there may be a delay associated with the video player application or display HAL determining that there was a user action, determining that the display refresh rate can be changed, and then instructing the display driver of the display refresh rate.

In the example techniques described in this disclosure, the display driver may receive information from touch controller 12 indicative of user activity (e.g., a duration or pressure of a user interaction with display panel 30 or pressure sensor 31A, and/or receive information from touch controller 12 about the rate at which the user is scrolling image content). In addition, an application (e.g., video player application or some other application) may be generating image content for display on display panel 30. The display driver may determine a display refresh rate of display panel 30 based at least in part on the received information indicative of the user activity, without receiving information for the display refresh rate from the application or the display HAL application. In this way, the display driver may determine the display refresh rate relatively quickly without waiting for input from the application generating the image content or the display HAL application.

Once the display driver determines the display refresh rate, the display driver may further adjust the display refresh rate based on feedback from the application that generated the image content or the display HAL application. For instance, the display driver, based on the information indicative of the duration or pressure of the user interaction or image content scrolling rate, may determine that the display refresh rate should be increased. The application may subsequently indicate that the display refresh rate should be set to a particular rate. The display driver may then adjust the display refresh rate if the rate indicated by the application is different than the display refresh rate that the display driver determined based on the user activity.

After determining the display refresh rate, the display driver may cause display panel 30 to display image content at the determined display refresh rate. However, the display driver may also utilize information received from other applications of what the display refresh rate should be to determine the display refresh rate. For example, the display driver may determine that the display refresh rate is less than the current display refresh rate based on the user activity. However, some applications may indicate that the display refresh rate should be the same. The display driver may then determine whether to cause display panel 30 to display at the current display refresh rate or at the display refresh rate determined based on the user activity. Accordingly, the display driver may cause display panel 30 to display image content based at least in part on the determined display refresh rate. To cause display panel 30 to display the image content at a particular display refresh rate, the display driver may cause display processor 28 to retrieve and display the image content on display panel 30 at the particular display refresh rate determined by the display driver based on the user activity and the information received from other applications of what the display refresh rate should be.

Figure 2:
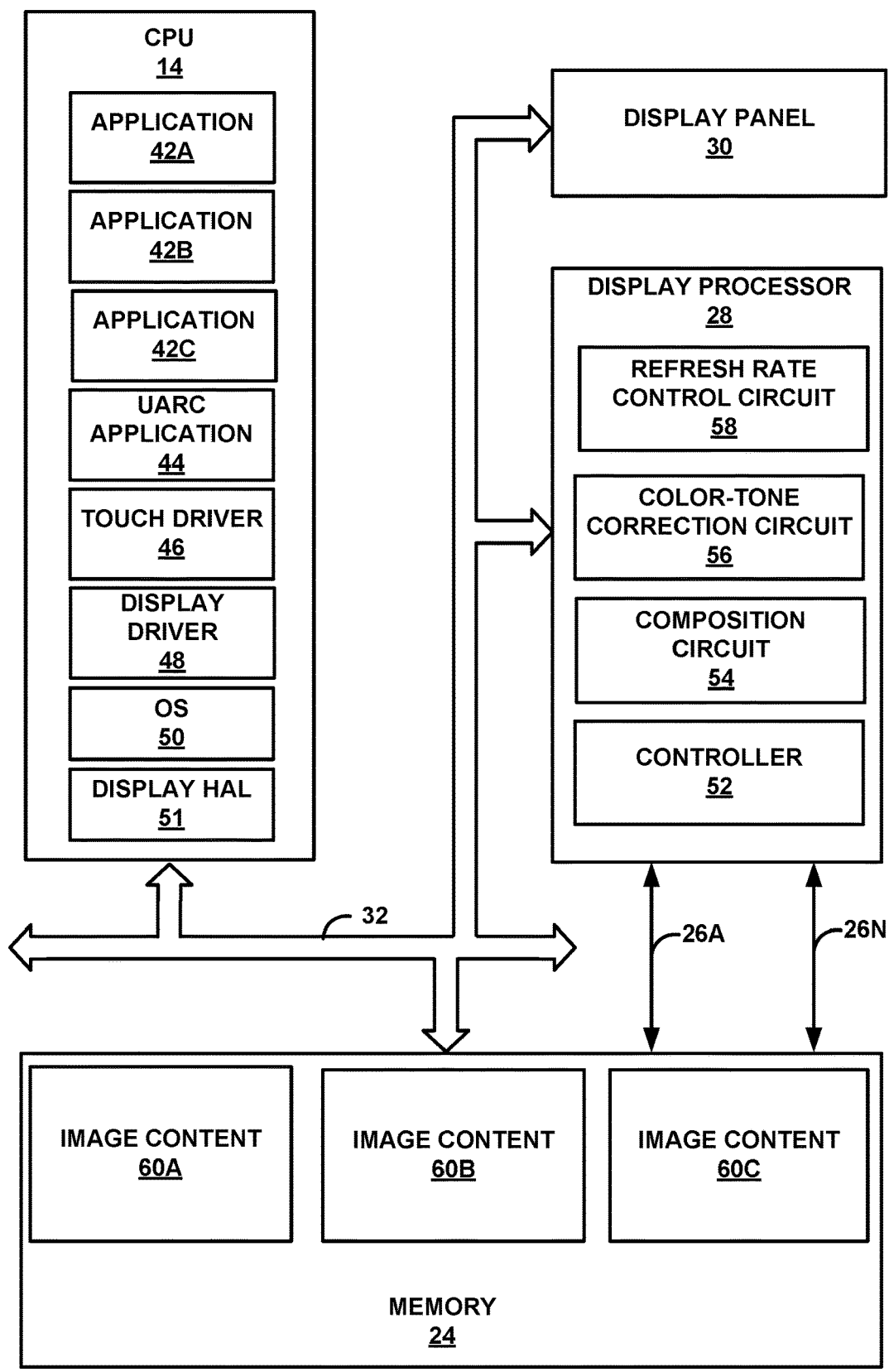
FIG. 2 is a block diagram illustrating a CPU, a display processor, and a memory of the computing device of FIG. 1 in further detail.

FIG. 2 is a block diagram illustrating a CPU 14, a display processor 28, and a memory 24 of the computing device 10 of FIG. 1 in further detail. As shown in FIG. 2, CPU 14 is communicatively coupled to display processor 28 and memory 24, and display processor 28 is communicatively coupled to CPU 14 and memory 24. Display processor 28 may be located on the same microchip as CPU 14 forming a system on a chip (SoC), or may be in a separate microchip.

As illustrated, CPU 14 is configured to execute one or more applications 42A-42C (collectively referred to as applications 42), a user interface activity rate change (UARC) application 44, touch driver 46, display driver 48, and operating system (OS) 50. CPU 14 may execute more or fewer applications than applications 42 that generate image content. Display processor 28 includes a controller 52, composition circuit 54, color-tone correction circuit 56, and refresh rate control circuit 58.

In some examples, controller 52, composition circuit 54, color-tone correction circuit 56, and refresh rate control circuit 58 may be fixed-function circuits. In some examples, controller 52, composition circuit 54, color-tone correction circuit 56, and refresh rate control circuit 58 represent programmable circuits that are programmable to perform the example techniques. In general, the example techniques of display processor 28 may be performed by fixed-function circuitry, programmable circuitry, or a combination of fixed-function and programmable circuitry.

UARC application 44, touch driver 46, and display driver 48 are described as software applications executing on CPU 14 to perform the example techniques described in this disclosure. However, the techniques are not so limited. In some examples, one or more of UARC application 44, touch driver 46, and display driver 48 may be formed as fixed-function circuits. As an example, a fixed-function circuit that may be internal to or external to CPU 14 may perform the operations of UARC application 44 and/or touch driver 46. Accordingly, the example techniques may be performed by fixed-function circuits, programmable circuits, or a combination of fixed-function and programmable circuits.

Applications 42 may include at least some of one or more instructions that cause graphic content to be displayed or one or more instructions that cause a non-graphics task (e.g., a general-purpose computing task) to be performed on GPU 16. GPU 16, in turn, may generate image content 60A-60C (collectively referred to as image content 60) for storage in system memory 24. Display processor 28 may retrieve image content 60 via pipes 26 and perform image processing to generate the image content for display.

As an example, display driver 48 may instruct controller 52 to retrieve image content 60 from system memory 24 and provide memory addresses of where to retrieve image content 60. In response, controller 52 may retrieve image content 60A via pipe 26A, image content 60B via pipe 26B, and image content 60C via pipe 26C. Controller 52 may output the image content to composition circuit 54.

Image content 60A-60C may be considered image layers having a back most layer, a front most layer, and intermediate layers that may or may not overlay on top of one another. For instance, image content 60A may overlay and occlude part of image content 60B. In this example, image content 60A is an image layer having a higher order than image content 60B.

Composition circuit 54 may blend or stitch image content 60 to form a single image frame. Controller 52 may output information indicating the order of image content 60 (e.g., of the image layers) and information indicating the position where image content 60 is to be displayed on display panel 30 to composition circuit 54. Controller 52 may receive information indicating the order of image content 60 and positions where image content 60 is to be displayed from display driver 48.

Based on the ordering information and positions where image content 60 is to be displayed, composition circuit 54 may blend or stitch the image layers. For example, if image content 60A occludes part of image content 60B, then for blending, composition circuit 54 may assign or receive information indicating that the part of image content 60A that occludes part of image content 60B has an opacity (or alpha) value of one. Accordingly, on the portion of display panel 30 where image content 60A is to be displayed, composition circuit 54 may cause the occluding part of image content 60A to be displayed rather than the occluded part of image content 60B. Other techniques for blending and stitching are possible.

Color-tone correction circuit 56 may receive the composed image frame from composition circuit 54 and perform image correction. For instance, there may be limits on the color gamut and luminance that display panel 30 can display. Color-tone correction circuit 56 may be preconfigured with correction matrices that adjust the color values of the image frame generated by composition circuit 54 to account for the capabilities of display panel 30. There may be other ways in which color-tone correction circuit 56 performs operations, and the example techniques should not be considered limited to the examples.

Refresh rate control circuit 58 may be configured to output image content to display panel 30 based on the display refresh rate determined by display driver 48. For example, display driver 48 may output information indicating the display refresh rate. Refresh rate control circuit 58 receives the information indicating the display refresh rate and outputs image content to display panel 30 from the image frame generated by color-tone correction circuit 56 based on the indicated display refresh rate. Accordingly, one example way in which CPU 14 causes display panel 30 to display image content at the determined display refresh rate is by display driver 48 causing refresh rate control circuit 58 to output image content at the determined display refresh rate.

Refresh rate control circuit 58 may also be referred to as a timing engine. Display driver 48, after determining the display refresh rate, may flush refresh rate control circuit 58 with the current display refresh rate, and instruct refresh rate control circuit 58 to output image content at the determined display refresh rate. As one example, display driver 48 may identify the frame from which refresh rate control circuit 58 should be outputting image content at the determined display refresh rate.

As illustrated, CPU 14 executes touch driver 46 and UARC application 44. Touch driver 46 receives information from touch controller 12 of FIG. 1. For example, touch driver 46 receives information from touch controller 12 that indicates the rate at which the user is scrolling the image content and the direction in which the user is scrolling the image content. In general, touch driver 46 provides the interface between CPU 14 and touch controller 12.

In some examples, touch driver 46 also receives information from touch controller 12 indicative of a duration and pressure of a user interaction with display panel 30 (e.g., pressure sensor 31B) or pressure sensor 31A. In some examples where display driver 48 determines a display refresh rate based on pressure or duration of user interaction, touch driver 46 may output information indicative of a duration and pressure to display driver 48. For touch driver 46 and display driver 48 to communicate with one another, display driver 48 may register touch driver 46 to provide information indicative of a duration and pressure of a user interaction (e.g., register a new input handler for pressure sensor).

Display driver 48 may selectively connect and disconnect with touch driver 46 and UARC application 44 as needed. In some cases, even where user activity (e.g., rate at which user is scrolling image content and/or pressure or duration of user interaction) controls operations of an application, it may be desirable to not let display driver 48 determine the display refresh rate based on information of the user activity. For example, it may be possible that the display refresh rate that display driver 48 determines based on user activity is substantially different than what the application would indicate as the display refresh rate. Accordingly, in some examples, a display HAL application (not shown) or the application itself may output a flag to display driver 48 that selectively enables or disables display driver 48 from using information of user activity for determining a display refresh rate.

In one or more example techniques, UARC application 44 receives information from touch driver 46 of the rate at which the user is scrolling the image content and generates information indicating the rate at which the user is scrolling the image content that is usable by display driver 48. In some examples, UARC application 44 may be part of touch driver 46, but is described as a separate application for ease of description.

UARC application 44 may compute a normalized value (e.g., between 0 and 1) based on the rate at which the user is scrolling the image content. For example, UARC application 44 may receive information indicating the number of sensors of display panel 30 that were activated within a time period (e.g., 10 sensors were activated within 10 milliseconds). UARC application 44 may divide the number of sensors activated by the time period to determine a rate at which the user is scrolling image content (e.g., 1 sensor per millisecond in this example).

In some examples, the number of sensors that are activated per unit of time indicates the distance traveled on display panel 30 to scroll per unit of time. Accordingly, in some examples, touch controller 12 may output information to touch driver 46 that indicates the distance traveled on display panel 30 within a time period. UARC application 44 may divide the distance traveled on display panel 30 by the time period to determine a rate at which the user is scrolling image content.

In this manner, there may be at least two ways in which UARC application 44 may determine the rate at which the user is scrolling image content. The first way may be based on the number of sensors activated in display panel 30 per unit of time. The second way may be based on the distance traveled on display panel 30 to scroll per unit of time. There may be other ways in which UARC application 44 may determine the rate at which the user is scrolling image content, including a combination of the first and second ways. In some examples, UARC application 44 may determine the rate at which the user is scrolling image content based on the pressure or duration of the user interaction with display panel 30 (e.g., via pressure sensor 31B) or pressure sensor 31A.

In some examples, UARC application 44 may compute a normalized value indicating the rate at which the user is scrolling the image content. For instance, UARC application 44 may generate a value between 0 and 1, where 1 indicates that the maximum display refresh rate is needed because the user is scrolling at a relatively high rate, and 0 indicates that the minimum display refresh rate is needed because the user is scrolling at a relatively low rate or not scrolling. UARC application 44 may use linear interpolation or some other technique to compute normalized values between 0 and 1 for intermediate scrolling rates. As one example, rather than using linear interpolation to compute normalized values between 0 and 1, UARC application 44 may use a look-up table that maps scrolling rates to values between 0 and 1.

In some examples, UARC application 44 may be configured to select set normalized values. For instance, UARC application 44 may be configured to select 0, 0.25, 0.5, 0.75, and 1 as normalized values. As an example, it may be possible for UARC application 44 to compute, based on linear interpolation, a value that is between 0 and 1 (e.g., 0.78). UARC application 44 may then determine whether the value is closest to 0, 0.25, 0.5, 0.75, or 1, and select the normalized value as one of 0, 0.25, 0.5, 0.75, or 1 based on which one of this set of the normalized values is closest to the value determined by linear interpolation. In this example, because 0.78 is closest to 0.75, UARC application 44 may determine the normalized value to be 0.75. Additional levels of granularity are possible. Also, computing a normalized value is not necessary in all examples.

Display driver 48 may receive information from UARC application 44 of the rate at which the user is scrolling image content (e.g., normalized value between 0 and 1). Display driver 48 may use the information indicating the rate at which the user is scrolling image content to determine the display refresh rate at which display panel 30 is to be refreshed. For instance, if UARC application 44 indicates that the user is not scrolling or scrolling at a relatively slow rate (e.g., because the user is reading a text file), display driver 48 may determine a relatively low display refresh rate which promotes and/or optimizes power and bandwidth utilization.

However, scrolling rate may not be the only factor that affects the display refresh rate. For example, if CPU 14 is executing a video player application, then it is likely that the user is not scrolling image content but is fixated on display panel 30. Here, reducing the display refresh rate may negatively impact viewing experience. Accordingly, in some examples, the output of UARC application 44 may be one input that display driver 48 uses to determine the display refresh rate.

For example, display driver 48 may determine a rate at which image content is generated by execution of one or more applications 42. Display driver 48 may determine the display refresh rate based on the rate at which the user is scrolling the image content, as indicated by UARC application 44, and the rate at which image content is generated by execution of one or more applications 42.

There may be various ways in which display driver 48 determines the rate at which image content is generated by execution of one or more applications 42. As one example, OS 50 may generate information indicating how often applications 42 are requesting to transmit image content to GPU 16. How often GPU 16 is being requested to generate image content may be indicative of the rate at which image content is generated by execution of one or more applications 42. As another example, display driver 48 or OS 50 may poll registers for GPU 16 or CPU 14 that indicate whether there are graphics related instructions that are waiting to be executed. If there are instructions waiting to be executed, then display driver 48 may determine that there is a relatively high rate at which image content is generated by execution of one or more applications 42. If there are no instructions waiting to be executed, the display driver 48 may determine that there is a relatively low rate at which image content is generated by execution of one or more applications. OS 50 may control the clock frequency of GPU 16 and CPU 14. If the clock frequency drops below a certain level, then display driver 48 may determine that one or more applications 42 are generating image content at a relatively low rate. There are other possible ways in which to determine the rate at which one or more applications 42 are generating image content, and the examples above are not limited.

Other factors, in addition to the rate at which one or more applications 42 are generating image content, may affect the display refresh rate. For example, whether the user is holding device 10 in landscape or portrait mode may affect the rate at which to refresh display panel 30. For instance, if in portrait mode, there may be a higher likelihood that the user is reading text rather than watching video, and if in landscape mode, there may be higher likelihood that the user is watching video than reading text. As described above, if the user is reading text, there may be possibilities to control the display refresh rate based on the rate at which the user is scrolling. However, for video playback, there may not be the possibility to control the display refresh rate based on the rate at which the user is scrolling.

Display driver 48 may use the output from UARC application 44 and information indicative of the rate at which one or more applications 42 are generating image content to determine the display refresh rate. CPU 14 may execute display HAL application 51. Display HAL application 51 may provide the interface that allows applications 42 to communicate with display driver 48. The use of display HAL application 51 is merely one example, and other examples are possible. For instance, applications 42 may communicate directly with display driver 48. In some examples, display HAL application 51 may be part of display driver 48, but is illustrated separately for ease of description.

As one example of how display driver 48 uses the output from UARC application 44 and information indicative of the rate at which one or more applications 42 are generating image content to determine the display refresh rate, display driver 48 may weigh the rate at which the user is scrolling image content (e.g., the output of UARC application 44) based on the information indicative of the rate at which image content is generated by execution of one or more applications 42. For instance, assume that UARC application 44 indicates that the user is scrolling image content at a slow rate, but display driver 48 receives information indicating that application 42A is generating image content at a relatively high rate. In this example, display driver 48 may weigh the output from UARC application 44 less based on the image content being generated by application 42A at a high rate to determine the display refresh rate.

Weighing the output from UARC application 44 means determining the effect that the rate at which the user is scrolling the image content will have on the display refresh rate calculation. If there are other applications that are generating image content at a relatively high rate, then the weight applied to the output of UARC application 44 may be lower (e.g., the rate at which the user is scrolling the image content has less effect on whether the display refresh rate is increased, decreased, or kept the same). If the other applications are not generating image content at a relatively high rate, or are generating image content at a low rate, then the weight applied to the output of UARC application 44 may be higher (e.g., the rate at which the user is scrolling image content has more effect on whether the display refresh rate is increased, decreased, or kept the same).

As also described above, in some examples, display driver 48 may use information from touch driver 46 indicative of the pressure and duration of the user interaction to determine a display refresh rate. In some examples, memory 24, or possibly local memory of CPU 14, stores a look-up table that maps duration or pressure with display refresh rate. For instance, in the above example, UARC application 44 may use a look-up table to map information indicating a rate at which the user is scrolling image content to a normalized value. Similarly, memory 24 or local memory of CPU 14 may store a look-up table that maps duration or pressure with display refresh rate. Display driver 48 may receive information indicative of the pressure and duration of the user interaction, and parse the look-up table to determine the display refresh rate. For example, display driver 48 may retrieve, from the look-up table, information that indicates the display refresh rate based on the information indicative of the duration or pressure of the user interaction.

Furthermore, in one or more examples, display driver 48 may determine the display refresh rate without receiving information of the display refresh rate from applications 42 or display HAL application 51. For instance, display driver 48 may rely only on the information indicative of a user activity (e.g., rate at which user is scrolling image content and/or a duration or pressure of a user interaction) to determine the display refresh rate. It should be understood that display driver 48 may determine multiple "display refresh rates" based on information from applications 42 or display HAL application 51. In this disclosure, display driver 48 may generate one of the display refresh rates based only on the information indicative of the user activity.

The display refresh rate may be a numerical value of the display refresh rate, or a relative change in the display refresh rate relative to the current display refresh rate. Other example ways to represent a determination of the display refresh rate are possible.

In this way, display driver 48 may be able to set a display refresh rate based on user activity (e.g., rate at which user is scrolling image content and/or the duration or pressure of the user interaction). For instance, when a layer update is initiated based on a trigger from pressure sensor 31B (e.g., pressure sensitive edge sensor), based on pressure and duration on display panel 30, or based on rate at which user is scrolling image content, display driver 48 may determine a display refresh rate based on the user activity. Display driver 48 may not need to wait for applications 42 or display HAL application 51 to set the display refresh rate.

Accordingly, display driver 48 may change the display refresh rate well before display processor 28 performs a composition cycle to compose the image content 60 generated by applications 42, which alleviates delays involving the migration of the display refresh rate when waiting on information from applications 42 or display HAL application 51 to change the display refresh rate. For example, because display driver 48 and applications 42 are different applications, display driver 48 may not need to wait for feedback from applications 42 before determining the display refresh rate based on the user activity information.

Subsequent to determining the display refresh rate, display driver 48 may receive, from applications 42 or display HAL application 51, information for the actual display refresh rate. For instance, based on how much content applications 42 are generating, display HAL application 51 may indicate to display driver 48 what the actual display refresh rate should be. Display driver 48 may compare the received information for the display refresh rate with the display refresh rate determined based on the user activity.

Display driver 48 may then adjust the display refresh rate based on the comparison. There may be various ways in which display driver 48 may adjust the display refresh rate. As one example, display driver 48 may apply the weighting operations described above to adjust the display refresh rate. Display driver 48 may select the highest display refresh rate from applications 42 or display HAL application 51 as the display refresh rate. Display driver 48 may then cause display panel 30 to display image content at the adjusted display refresh rate (e.g., cause refresh rate control circuit 58 to output image content at the adjusted display refresh rate).

The examples of determining the display refresh rate based on the rate at which the user is scrolling image content and determining the display refresh rate based on the pressure or duration of a user interaction may be performed together. As one example, the pressure or duration of the user interaction may be one way in which the user controls the rate at which to scroll the image content. For example, display driver 48 may receive input from URAC application 44 and receive information of the pressure or duration of a user interaction from touch driver 46. In some examples, display driver 48 may determine the display refresh rate of display panel 30 based at least in part on the rate at which the user is scrolling image content and the duration or pressure of the user interaction with display panel 30. As another example, display driver 48 may determine the rate at which the user is scrolling image content based on the duration or pressure of the user interaction with display panel 30.

Figure 3:
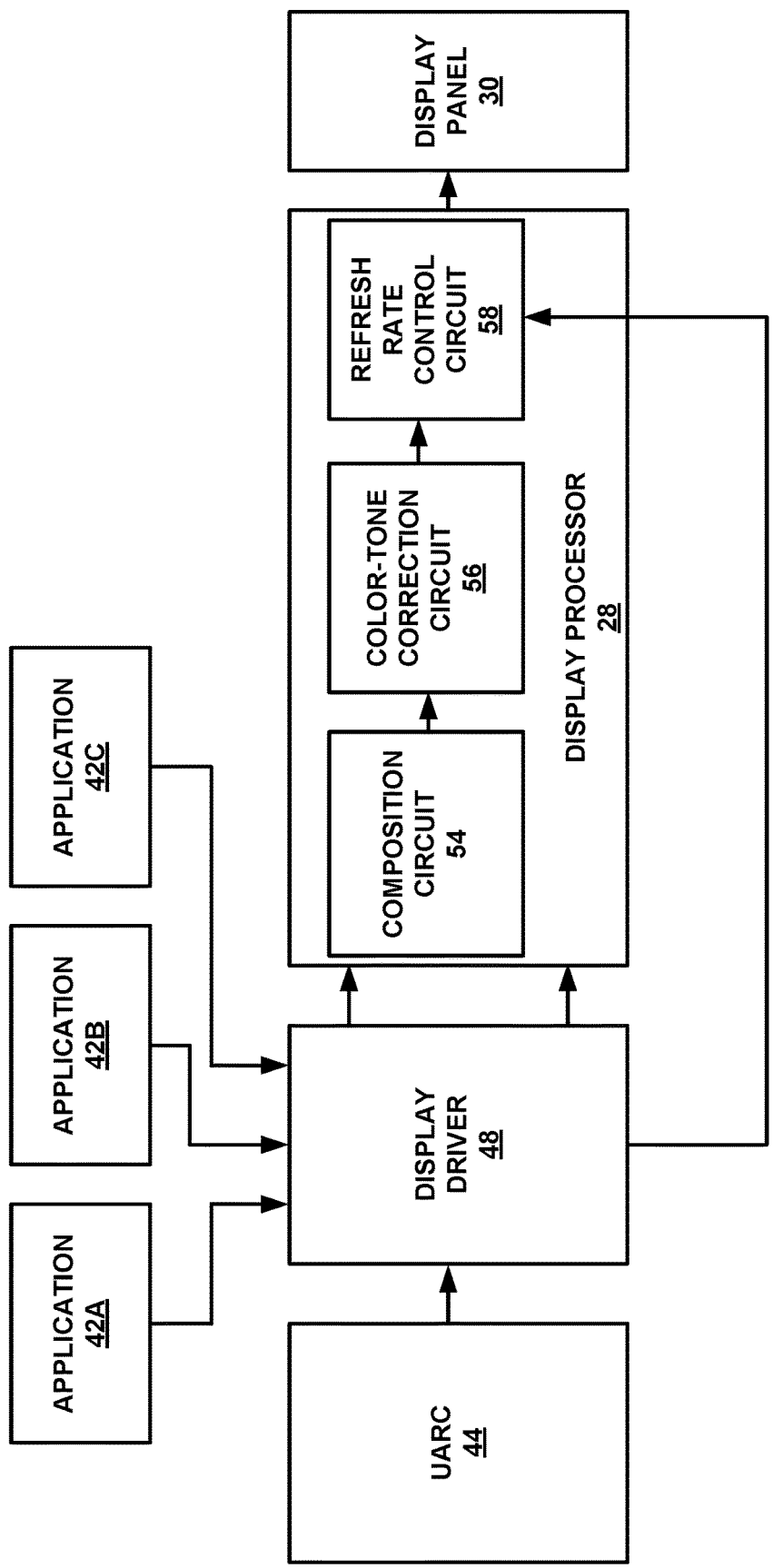
FIG. 3 is a process diagram illustrating an example process according to one or more example techniques described in this disclosure.

FIG. 3 is a process diagram illustrating an example process according to one or more example techniques described in this disclosure. The components in FIG. 3 having the same reference numeral as the components in FIG. 2 are the same or substantially the same. Therefore, those components are not described in further detail. Rather, FIG. 3 is used to describe example conditions under which the techniques described in this disclosure may be applied. Although not illustrated in FIG. 3, in some examples, applications 42 may communicate with display driver 48 via display HAL application 51.

As described above, the display refresh rate may be based on the user activity and the rate at which image content is generated by execution of one or more applications 42. Also, to determine the display refresh rate, display driver 48 may weight the user activity with the information indicative of a rate at which image content is generated by execution of one or more applications 42, and determine the display refresh rate based on the weighting of the user activity, and the rate at which image content is generated by execution of one or more applications.

As an example, assume that in FIG. 3, the output of UARC application 44 indicates that the rate at which the user is scrolling image content is relatively high. One example of a scrolling at a relatively high rate is scrolling such that the bottom portion of the frame being displayed becomes the top portion of the frame being displayed in less than 10 milliseconds, and vice-versa. This example of scrolling at a relatively high rate is one example, but the meaning of relatively high rate may be different and case-by-case specific. Display driver 48 may receive a value closer to one from UARC application 44 indicating that the rate at which the user is scrolling image content is relatively high.

In this example, display driver 48 may receive information indicating that the rate at which image content is generated by execution of one or more applications 42 is relatively low. One example of rate of image content being generated being relatively low is if image content is being generated at less than or equal to 30 fps. For this example, display driver 48 may determine the display refresh rate to be relatively high (e.g., greater than or equal to 60 fps) based on the rate at which the user is scrolling image content being relatively high, and the information indicating that the rate at which image content is generated by execution of one or more applications 42 is relatively low. Display driver 48 may then cause refresh rate control circuit 58 to refresh display panel 30 at a relatively high display refresh rate.

As another example, assume that in FIG. 3, the output of UARC application 44 indicates that the rate at which the user is scrolling image content is relatively low. One example of scrolling at a relatively low rate is scrolling such that the bottom portion of the frame being displayed becomes the top portion of frame being displayed in more than 30 milliseconds, and vice-versa. In this example, display driver 48 may receive a value closer to zero from UARC application 44 indicating that the rate at which the user is scrolling image content is relatively low.

In this example, display driver 48 may receive information indicating that the rate at which image content is generated by execution of one or more applications 42 is relatively high. One example of rate of image content being generating being relatively high is if image content is being generated at greater or equal to 60 fps. For this example, display driver 48 may determine the display refresh rate to be relatively high (e.g., greater than or equal to 60 fps) based on the rate at which the user is scrolling image content being relatively low, and the information indicating that the rate at which image content is generated by execution of the one or more applications is relatively high. Display driver 48 may then cause refresh rate control circuit 58 to refresh display panel 30 at a relatively high display refresh rate.

As another example, assume that in FIG. 3, the output of UARC application 44 indicates that the rate at which the user is scrolling image content is relatively low. In this example, display driver 48 may receive a value closer to zero from UARC application 44 indicating that the rate at which the user is scrolling image content is relatively low. In this example, display driver 48 may receive information indicating that the rate at which image content is generated by execution of one or more applications 42 is relatively low. For this example, display driver 48 may determine the display refresh rate to be relatively low (e.g., less than or equal to 30 fps) based on the rate at which the user is scrolling image content being relatively low, and the information indicating that the rate at which image content is generated by execution of one or more applications 42 is relatively low. Display driver 48 may then cause refresh rate control circuit 58 to refresh display panel 30 at a relatively low display refresh rate.

As another example, assume that in FIG. 3, the output of UARC application 44 indicates that the rate at which the user is scrolling image content is relatively high. In this example, display driver 48 may receive a value closer to one from UARC application 44 indicating that the rate at which the user is scrolling image content is relatively high. In this example, display driver 48 may receive information indicating that the rate at which image content is generated by execution of one or more applications 42 is relatively high. For this example, display driver 48 may determine the display refresh rate to be relatively high (e.g., greater than or equal to 60 fps) based on the rate at which the user is scrolling image content being relatively high, and the information indicating that the rate at which image content is generated by execution of one or more applications 42 is relatively high. Display driver 48 may then cause refresh rate control circuit 58 to refresh display panel 30 at a relatively high display refresh rate.

Figure 4:
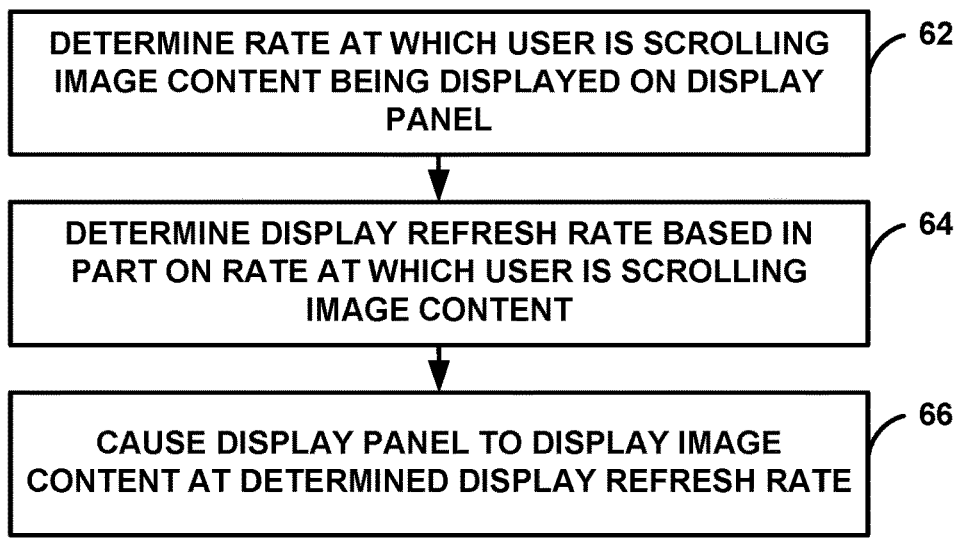
FIG. 4 is a flowchart illustrating an example method of operation according to one or more example techniques described in this disclosure.

FIG. 4 is a flowchart illustrating an example method of operation according to one or more example techniques described in this disclosure. As illustrated in FIG. 4, processing circuitry (e.g., CPU 14 via execution of display driver 48 or a combination of CPU 14 and display processor 28) may determine a rate at which a user is scrolling image content being displayed on display panel 30 (62). Touch controller 12 may receive information indicating which sensors of display panel 30 were activated within a time period. Touch driver 46 receives information from touch controller 12 and outputs the information to UARC application 44. UARC application 44 determines the rate at which the user is scrolling image content on display panel 30 by dividing the number of activated sensors by the time period, and in some examples, determines a normalized output value between 0 and 1. Display driver 48 receives the information indicative of the rate at which the user is scrolling image content on display panel 30 based on the output from UARC application 44.

The processing circuitry (e.g., CPU 14 via execution of display driver 48 or a combination of CPU 14 and display processor 28) may determine a display refresh rate based at least in part on the rate at which user is scrolling image content (64). The display refresh rate is indicative of how often image content from system memory 24 is retrieved and displayed on display panel 30. If the user is scrolling at a relatively high rate, then display driver 48 may determine a relatively high display refresh rate. If the user is scrolling at a relatively low rate, then display driver 48 may determine a relatively low display refresh rate, but may also account for image content generated by one or more applications 42, as described in more detail above and with respect to FIG. 5.

The processing circuitry may cause display panel 30 to display image content at the determined display refresh rate (66). For example, display driver 48 may cause refresh rate control circuit 58 of display processor 28 to output image content at the determined display refresh rate.

Figure 5:
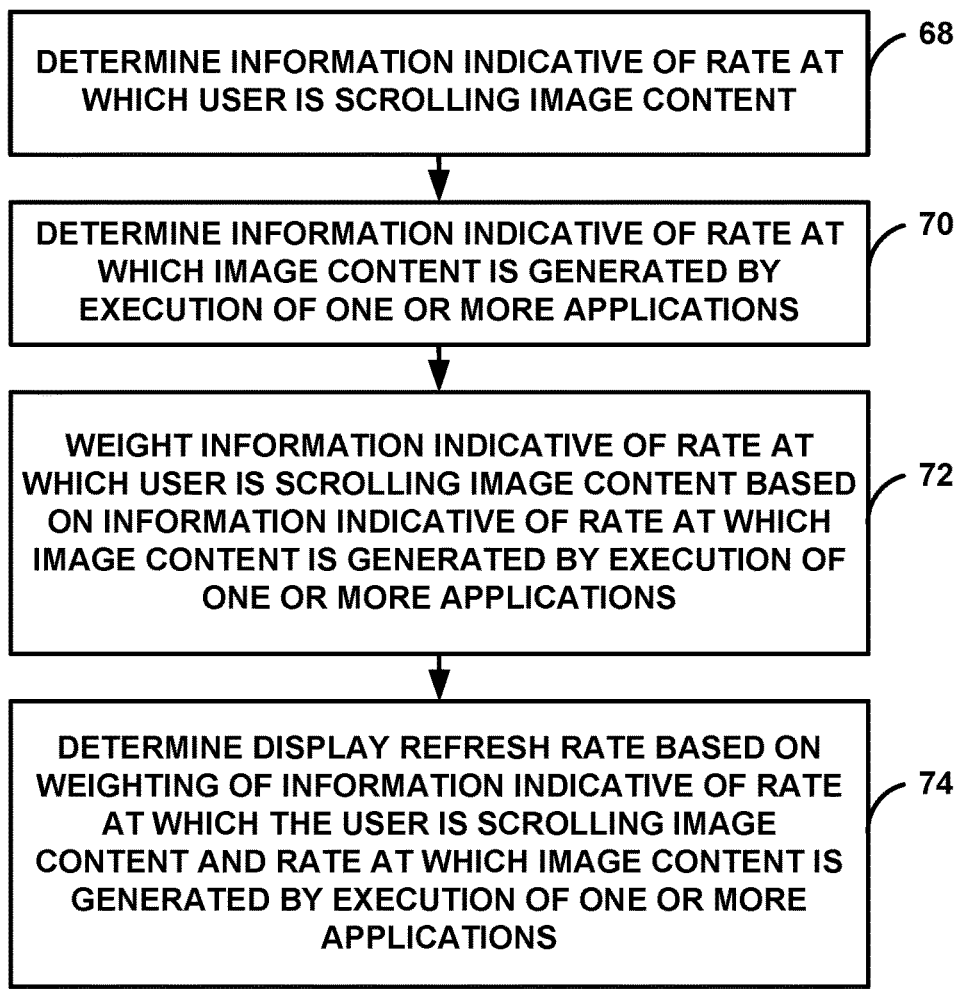
FIG. 5 is a flowchart illustrating an example method of operation according to one or more example techniques described in this disclosure.

FIG. 5 is a flowchart illustrating an example method of operation according to one or more example techniques described in this disclosure. FIG. 5 provides additional example ways in which to determine the display refresh rate based in part on the rate at which the user is scrolling image content.

As illustrated, processing circuitry (e.g., CPU 14 via display driver 48 or a combination of CPU 14 and display processor 28) may determine information indicative of the rate at which user is scrolling image content (68). For example, display driver 48 may receive a normalized value between 0 and 1 that indicates the rate at which the user is scrolling image content.

The processing circuitry may determine information indicative of rate at which image content is generated by execution of one or more applications 42 (70). As described above, display driver 48 may receive information from OS 50, may determine the clock frequency, may determine if there are instructions to be executed by GPU 16, and/or other information to determine the rate at which image content is generated by execution of one or more applications 42.

In some examples, display driver 48 may weight information indicative of a rate at which user is scrolling image content based on information indicative of a rate at which image content is generated by execution of one or more applications (72). For example, if image content is being generated at a relatively high rate, then the rate at which the user is scrolling image content may have less effect on the display refresh rate. However, if image content is being generated at a relatively low rate, then the rate at which the user is scrolling image content may have a greater effect on the display refresh rate. In such examples, display driver 48 may determine the display refresh rate based on the weighting of the information indicative of the rate at which the user is scrolling image content and the rate at which image content is generated by execution of one or more applications (74).

As described above, the example techniques may provide power and bandwidth savings. In some examples, refreshing display panel 30 at 60 fps requires 206.64 milliamps, refreshing display panel 30 at 45 fps requires 192.49 milliamps, and refreshing display panel 30 at 30 fps requires 178.98 milliamps. Therefore, if it is possible to refresh display panel 30 at 45 fps instead of 60 fps, the techniques may provide approximately 15 milliamps in saving. If it is possible to refresh display panel 30 at 30 fps instead of 60 fps, the techniques may provide approximately 29 milliamps in saving.

Figure 6:
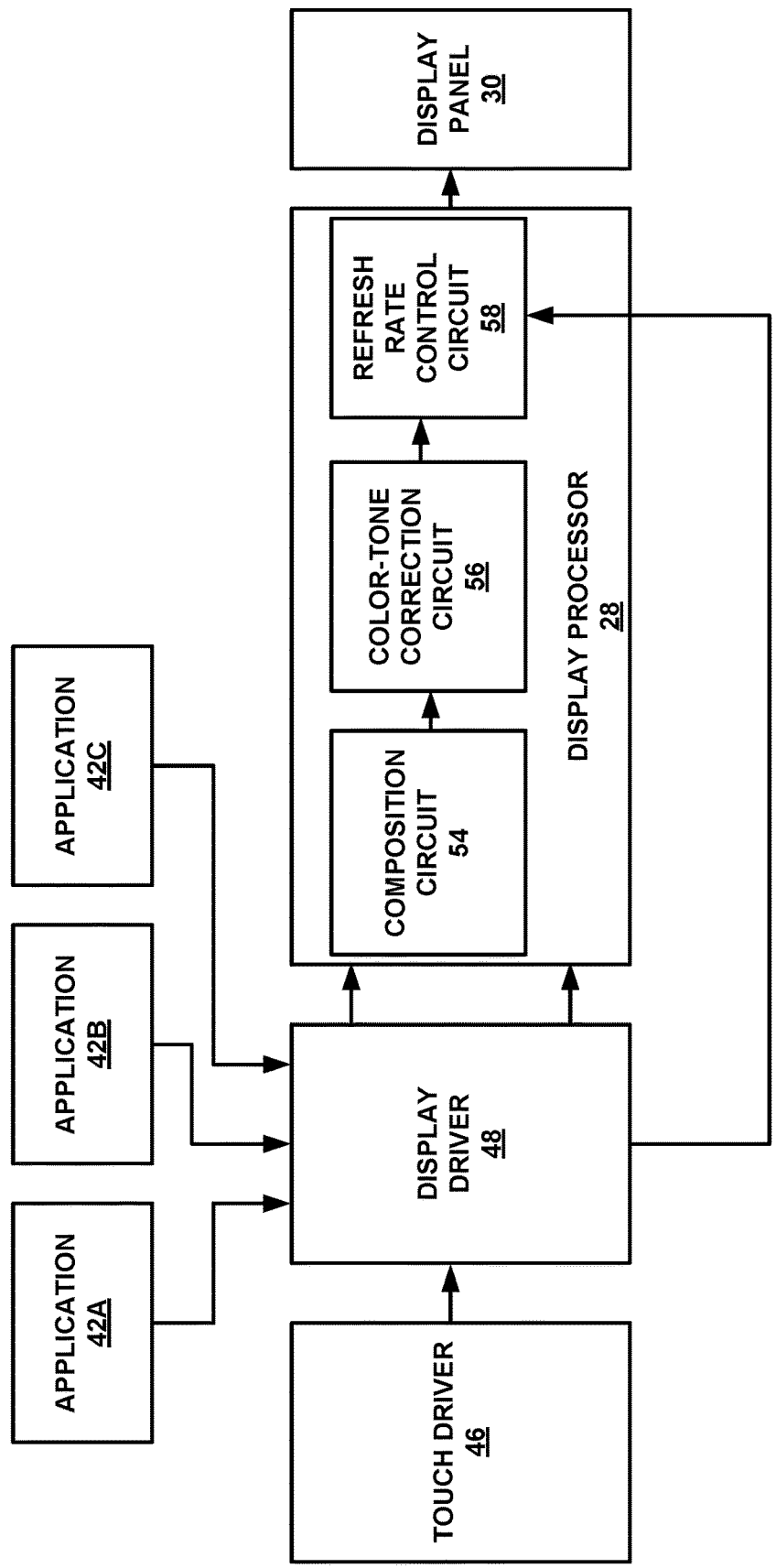
FIG. 6 is a process diagram illustrating an example process according to one or more example techniques described in this disclosure.

FIG. 6 is a process diagram illustrating an example process according to one or more example techniques described in this disclosure. The components in FIG. 6 having the same reference numerals as the components in FIG. 2 are the same or substantially the same. Therefore, those components are not described in further detail. Rather, FIG. 6 is used to describe example conditions under which the techniques described in this disclosure may be applied. Although not illustrated in FIG. 6, in some examples, applications 42 may communicate with display driver 48 via display HAL application 51.

As illustrated, display driver 48 receives input from touch driver 46 indicative of a duration or pressure of a user interaction with display panel 30 or pressure sensor 31 that display driver 48 uses for determining a first display refresh rate. In some examples, for display driver 48 to make use of such information from touch driver 46, display driver 48 may receive an indication from applications 42 or display HAL application 51 enabling determination of the first display refresh rate based on the information indicative of the duration or pressure of the user interaction.

Display driver 48 may retrieve, from a look-up table, information that indicates the display refresh rate based on the information indicative of the duration or pressure of the user interaction. For instance, display driver 48 may parse the look-up table and compare entries in the look-up table to the information indicative of the duration or pressure of the user interaction. After display driver 48 finds the entry having the information indicative of the duration or pressure of the user interaction, display driver 48 may determine the display refresh rate associated with the entry, and in this way, determines a first display refresh rate without receiving information of the display refresh rate from applications 42 or display HAL application 51.

In some examples, display driver 48 causes display panel 30 to display image content based at least in part on the determined first display refresh rate. There may be at least two ways in which display driver 48 causes display panel 30 to display image content based at least in part on the determined first display refresh rate. As one example, display driver 48 causes display panel 30 to display image content at the first display refresh rate.

As another example of display driver 48 causing display panel 30 to display image content based at least in part on the determined first display refresh rate, display driver 48 may determine whether to adjust the first display refresh rate based on various factors such as a comparison of display refresh rates from applications 42 or display HAL application 51 and the first display refresh rate. Display driver 48 may cause refresh rate control circuit 58 to output image content from system memory 24 at the display refresh rate determined by display driver 48.

Figure 7:
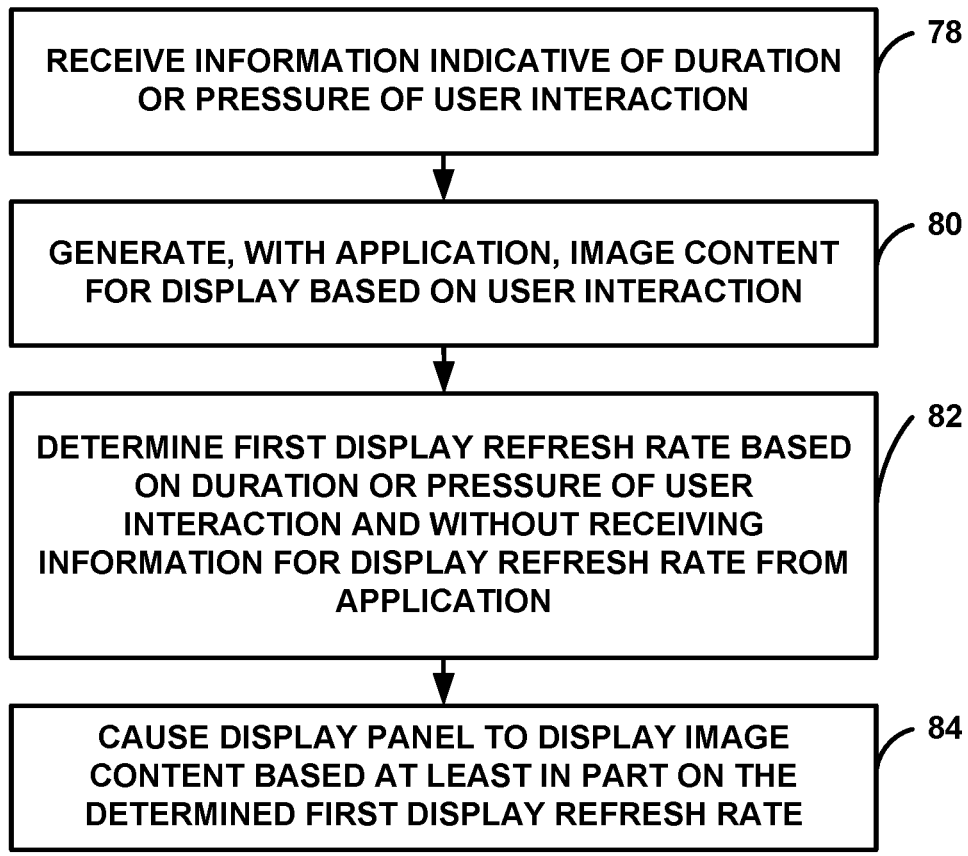
FIG. 7 is a flowchart illustrating an example method of operation according to one or more example techniques described in this disclosure.

FIG. 7 is a flowchart illustrating an example method of operation according to one or more example techniques described in this disclosure. As illustrated, a processing circuitry (e.g., CPU 14 via display driver 48 or a combination of CPU 14 and display processor 28) receives information indicative of a duration or pressure of a user interaction with display panel 30 or pressure sensor 31 (78). As described above, "a duration or pressure of a user interaction" includes a duration of the user interaction, a pressure of the user interaction, or a duration and pressure of the user interaction.

Touch driver 46 may receive information indicative of a duration or pressure of the user interaction. For example, the amplitude of the signal received from touch controller 12 may be indicative of the pressure of the user interaction. As another example, to determine a duration of the user interaction, touch driver 46 may determine an amount of time a signal received from touch controller 12 is a logic high. For example, if touch driver 46 determines that touch controller 12 received logic high for 2 seconds, then the duration of the user interaction is 2 seconds.

Display driver 48 may receive such information from touch driver 46. As described above, in some examples, display driver 48 may need to be enabled (e.g., by receiving a flag or other syntax data) to use information indicative of the duration and pressure of the user interaction to determine the first display refresh rate. Accordingly, in some examples, display driver 48 may receive an indication enabling determination of the first display refresh rate based at least in part on the received information indicative of the duration or pressure of the interaction.

Processing circuitry (e.g., CPU 14 via one or more applications 42) generates image content for display on display panel 30 based on the user interaction (80). For example, if the user presses down on an icon for a messaging application, CPU 14 may generate image content for display based on what the operation should be responsive to the user pressing down on the icon. The image content that CPU 14, via one or more applications, needs to generate may be based on the pressure and/or duration of the user interaction with display panel 30 (e.g., pressure sensor 31B) and/or pressure sensor 31A. For instance, a light touch may cause CPU 14 to perform operations to generate one type of image content, and a hard touch may cause CPU 14 to perform operations to generate another type of image content.

Processing circuitry (e.g., CPU 14 via display driver 48) may determine a first display refresh rate based on the duration or pressure of the user interaction and without receiving information for the display refresh rate from one or more applications 42 that generated the image content (82). For example, display driver 48 may retrieve, from a look-up table, information that indicates the first display refresh rate based on the information indicative of the duration or pressure of the user interaction.

Processing circuitry may cause display panel 30 to display image content based at least in part on the determined first display refresh rate (84). For instance, display panel 30 may display image content at the first display refresh rate. In some examples, display panel 30 may display image content at an adjusted display refresh rate that is adjusted based on the first display refresh rate.

For example, subsequent to determining the first display refresh rate, the processing circuitry (e.g., CPU 14 via display driver 48) may receive information, from one or more applications 42 or display HAL application 51, including a second display refresh rate (e.g., the actual display refresh rate determined by applications 42 and/or display HAL application 51). Display driver 48 may compare the second display refresh rate with the first display refresh rate, and adjust the display refresh rate based on the comparison. As described above, there may be various factors that cause display driver 48 to adjust the display refresh rate. As one example, the rate at which the user is scrolling image content may affect whether the display refresh rate is to be adjusted. As another example, display driver 48 may weight display refresh rates needed for applications 42 based on the first display refresh rate. Other ways to adjust the display refresh rate are possible. Display driver 48 may cause display panel 30 to display image content at the adjusted display refresh rate.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for display refresh rate adjustment, the method comprising:
   receiving, with a display driver executing on a processing circuit, information indicative of a duration of a user interaction with a display panel or a pressure of the user interaction with a pressure sensor;
   generating, with an application, image content for display on the display panel based on the user interaction;
   determining, with the display driver, a display refresh rate of the display panel directly based at least in part on the received information indicative of the duration or pressure of the user interaction, wherein the display driver determines the display refresh rate without input from the application that generated the image content or input from a display hardware abstraction layer (HAL) application that indicates the display refresh rate and without the information indicative of the duration or pressure passing through the display HAL application or the application that generated the image content, wherein the display refresh rate indicates how often image content from a system memory is retrieved and displayed on the display panel, wherein the display HAL application provides an interface that allows the application that generated the image content to communicate with the display driver, and wherein the display driver is different than the application that generated the image content; and
   causing, with the display driver, the display panel to display the image content based at least in part on the determined display refresh rate.

2. The method of claim 1, wherein the display driver is configured to cause a display processor to output the image content to the display panel based on the determined display refresh rate.

3. The method of claim 1, wherein the display refresh rate comprises a first display refresh rate, the method further comprising:
   subsequent to determining the first display refresh rate, receiving, from the application or the display HAL application, information for a second display refresh rate;
   comparing the received information for the second display refresh rate with the first display refresh rate determined based on the received information indicative of the duration or pressure of the user interaction;
   determining an adjusted display refresh rate based on the comparison; and
   causing the display panel to display image content at the adjusted display refresh rate.

4. The method of claim 1, wherein the display panel is operating in video mode and does not include a frame buffer, wherein the entire image content is refreshed per refresh cycle when the display panel is operating in the video mode, and wherein causing the display to display image content comprises causing the display panel, operating in the video mode, to display image content at the determined display refresh rate.

5. The method of claim 1, further comprising:
receiving an indication enabling determination of the display refresh rate based at least in part on the received information indicative of the duration or pressure of the user interaction.

6. The method of claim 1, further comprising:
determining a rate at which a user is scrolling the image content being displayed on the display panel based on the received information indicative of the duration or pressure of the user interaction with the display panel or the pressure sensor,
wherein determining the display refresh rate comprises determining the display refresh rate based on the rate at which the user is scrolling the image content.

7. A device for display refresh rate adjustment, the device comprising:
a system memory;
a display panel;
a pressure sensor; and
processing circuitry configured to:
receive, with a display driver executing on the processing circuitry, information indicative of a duration of a user interaction with the display panel or a pressure of the user interaction with the pressure sensor;
generate, with an application, image content for display on the display panel based on the user interaction;
determine, with the display driver, a display refresh rate of the display panel directly based at least in part on the received information indicative of the duration or pressure of the user interaction, wherein the display driver determines the display refresh rate without input from the application that generated the image content or input from a display hardware abstraction layer (HAL) application that indicates the display refresh rate and without the information indicative of the duration or pressure passing through the display HAL application or the application that generated the image content, wherein the display refresh rate indicates how often image content from the system memory is retrieved and displayed on the display panel, wherein the display HAL application provides an interface that allows the application that generated the image content to communicate with the display driver, and wherein the display driver is different than the application that generated the image content; and
cause the display panel to display image content based at least in part on the determined display refresh rate.

8. The device of claim 7, wherein the device further comprises a display processor, and wherein the display driver is configured to cause the display processor to output the image content to the display panel based on the determined display refresh rate.

9. The device of claim 7, wherein the display refresh rate comprises a first display refresh rate, and wherein the processing circuitry is configured to:
subsequent to determining the first display refresh rate, receive, from the application or the display HAL application, information for a second display refresh rate;
compare the received information for the second display refresh rate with the first display refresh rate determined based on the received information indicative of the duration or pressure of the user interaction;
determine an adjusted display refresh rate based on the comparison; and
cause the display panel to display image content at the adjusted display refresh rate.

10. The device of claim 7, wherein the display panel is operating in video mode and does not include a frame buffer, wherein the entire image content is refreshed per refresh cycle when the display panel is operating in the video mode, and wherein to cause the display to display image content, the processing circuitry is configured to cause the display panel, operating in the video mode, to display image content at the determined display refresh rate.

11. The device of claim 7, wherein the processing circuitry is configured to:
receive an indication enabling determination of the display refresh rate based at least in part on the received information indicative of the duration or pressure of the user interaction.

12. The device of claim 7, wherein the processing circuitry is configured to:
determine a rate at which a user is scrolling the image content being displayed on the display panel based on the received information indicative of the duration or pressure of the user interaction with the display panel or the pressure sensor, and
wherein to determine the display refresh rate, the processing circuitry is configured to determine the display refresh rate based on the rate at which the user is scrolling the image content.

13. A device for display refresh rate adjustment, the device comprising:
a system memory;
a display panel;
a pressure sensor;
means for receiving, with a display driver executing on a processing circuit, information indicative of a duration of a user interaction with the display panel or a pressure of the user interaction with the pressure sensor;
means for generating, with an application, image content for display on the display panel based on the user interaction;
means for determining, with the display driver, a display refresh rate of the display panel directly based at least in part on the received information indicative of the duration or pressure of the user interaction, wherein the display driver determines the display refresh rate without input from the application that generated the image content or input from a display hardware abstraction layer (HAL) application that indicates the display refresh rate and without the information indicative of the duration or pressure passing through the display HAL application or the application that generated the image content, wherein the display refresh rate indicates how often image content from the system memory is retrieved and displayed on the display panel, wherein the display HAL application provides an interface that allows the application that generated the image content to communicate with the display driver, and wherein the display driver is different than the application that generated the image content; and
means for causing the display panel to display the image content based at least in part on the determined display refresh rate.

14. The device of claim 13, wherein the display driver is configured to cause a display processor to output the image content to the display panel based on the determined display refresh rate.

15. The device of claim 13, wherein the display refresh rate comprises a first display refresh rate, the device further comprising:

means for receiving, from the application or the display HAL application, the information for a second display refresh rate, subsequent to determining the first display refresh rate;

means for comparing the received information for the second display refresh rate with the first display refresh rate determined based on the received information indicative of the duration or pressure of the user interaction;

means for determining an adjusted display refresh rate based on the comparison; and means for causing the display panel to display image content at the adjusted display refresh rate.

16. The device of claim 13, wherein the display panel is operating in video mode and does not include a frame buffer, wherein the entire image content is refreshed per refresh cycle when the display panel is operating in the video mode, and wherein the means for causing the display to display image content comprises means for causing the display panel, operating in the video mode, to display image content at the determined display refresh rate.

17. The device of claim 13, further comprising:

means for receiving an indication enabling determination of the display refresh rate based on at least in part on the received information indicative of the duration or pressure of the user interaction.

18. A computer-readable storage medium storing instructions that when executed cause one or more processors of a device for display refresh rate adjustment to:

receive, with a display driver executing on the one or more processors, information indicative of a duration of a user interaction with a display panel or a pressure of the user interaction with a pressure sensor;

generate, with an application, image content for display on the display panel based on the user interaction;

determine, with the display driver, a display refresh rate of the display panel directly based at least in part on the received information indicative of the duration or pressure of the user interaction, wherein the display driver determines the display refresh rate without input from the application that generated the image content or input from a display hardware abstraction layer (HAL) application that indicates the display refresh rate and without the information indicative of the duration or pressure passing through the display HAL application or the application that generated the image content, wherein the display refresh rate indicates how often image content from a system memory is retrieved and displayed on the display panel, wherein the display HAL application provides an interface that allows the application that generated the image content to communicate with the display driver, and wherein the display driver is different than the application that generated the image content; and cause, with the display driver, the display panel to display the image content based at least in part on the determined display refresh rate.

19. The computer-readable storage medium of claim 18, wherein the display driver is configured to cause a display processor to output the image content to the display panel based on the determined display refresh rate.

20. The computer-readable storage medium of claim 18, wherein the display refresh rate comprises a first display refresh rate, the storage medium further comprising instructions that cause the one or more processors to:

receive, from the application or the display HAL application, information for a second display refresh rate, subsequent to determining the first display refresh rate;

compare the received information for the second display refresh rate with the first display refresh rate determined based on the received information indicative of the duration or pressure of the user interaction;

determine an adjusted display refresh rate based on the comparison; and cause the display panel to display image content at the adjusted display refresh rate.

21. The computer-readable storage medium of claim 18, wherein the display panel is operating in video mode and does not include a frame buffer, wherein the entire image content is refreshed per refresh cycle when the display panel is operating in the video mode, and wherein the instructions that cause the display to display image content comprise instructions that cause the display panel, operating in the video mode, to display image content at the determined display refresh rate.

* * * * *